UNITED STATES PATENT OFFICE.

GRAHAM CLARKE, OF CLEVELAND, OHIO, ASSIGNOR TO THE OHIO CHEMICAL & MFG. COMPANY, OF CLEVELAND, OHIO, A CORPORATION OF OHIO.

PROCESS OF MAKING EPSOM SALTS.

1,112,770.  Specification of Letters Patent.  Patented Oct. 6, 1914.

No Drawing.  Application filed August 2, 1913. Serial No. 782,549.

*To all whom it may concern:*

Be it known that I, GRAHAM CLARKE, a citizen of the United States, residing at Cleveland, in the county of Cuyahoga and State of Ohio, have invented a certain new and useful Improvement in Processes of Making Epsom Salts, of which the following is a full, clear, and exact description.

The object of this invention is to produce Epsom salts very cheaply. The ability to produce the product of the herein described process at low cost is mainly due to the fact that the raw materials used may be obtained very cheaply.

Generally speaking, the invention comprises a process in which calcined magnesite or dolomite is caused to react with an aqueous solution of ferrous sulfate. As is well known, magnesite and dolomite are minerals which are well known and cost comparatively little, while the solution of ferrous sulfate is a waste product which is available in nearly all iron and steel mills where iron is pickled in sulfuric acid for the purpose of removing scale.

In general, it may be said that the process depends upon the fact that magnesium oxid in very finely divided condition, added to a hot aqueous solution of ferrous sulfate and the mixture thoroughly agitated, will cause the precipitation of ferrous hydrate, leaving the magnesium sulfate in solution.

The reaction which takes place, I believe to be as follows:

$FeSO_4 + MgO + H_2O = MgSO_4 + Fe(OH)_2$

In carrying out the process, I obtain the magnesium oxid by calcining the mineral magnesite, which as is well known, is in its natural state magnesium carbonate. Calcination of this product will produce magnesium oxid. The oxid obtained by calcining must be finely pulverized, and I have found that the finer that it is pulverized, the better and quicker will be the reaction. This finely pulverized magnesium oxid is then mixed with a hot aqueous solution of ferrous sulfate, the empirical formula for which is $FeSO_4$. The mixture is agitated by forcing air through the same or by any other desired method of agitation. This causes a thorough mixture to take place, and the magnesium oxid reacts with the ferrous sulfate to precipitate ferrous hydrate which carries down the insoluble impurities which may have existed in the magnesite, such as silica and leaves in solution the magnesium sulfate. By filtering, the precipitated materials are removed and the resultant solution containing the magnesium sulfate may be evaporated to dryness.

In adding the magnesium oxid, it is best to add a slight excess in order that the precipitation of the iron may be assured.

As before stated, dolomite may be utilized as the source of the magnesium. This mineral, as is well known, is a double carbonate of magnesium and calcium, and when calcined will produce the double oxid of magnesium and calcium. This material is finely pulverized, and mixed with a hot solution of ferrous sulfate. Care should be taken not to add an excess of the calcined dolomite, for if this is done, it will cause lime water to be formed, that is to say, calcium hydrate dissolved in the water, and the presence of this calcium hydrate in solution will cause a precipitation of the magnesium as an oxid.

I have found in using dolomite that it is preferable to add about 90 per cent. of the calculated quantity of calcined dolomite, and to then add a little more than ten per cent. of magnesium oxid or calcined magnesite, which will be sufficient to cause the reaction without the formation of lime water. The reaction in this case, I believe to be as follows:

$2FeSO_4 + CaO + MgO + 2H_2O = 2Fe(OH)_2 + CaSO_4 + MgSO_4$

The mixture of calcined dolomite and ferrous sulfate is agitated, preferably by the use of air, as heretofore explained. The iron hydrate will be filtered, leaving the magnesium sulfate and calcium sulfate in solution. The magnesium sulfate may be separated from the calcium sulfate in the solution remaining after filtration by fractional crystallization, which will result in the crystallization of the calcium sulfate, leaving the magnesium sulfate in solution. The crystals may be separated from the solution after which the magnesium sulfate may be obtained by evaporating the solution to dryness.

The air which is utilized in this process is merely for the purpose of agitating, and the oxygen of the air performs no function in the process. If the magnesite or dolomite be completely calcined, and ground very fine, the reaction with the hot ferrous sulfate solution is practically instantaneous before any oxidizing of the solution would take place.

Having thus described my invention, what I claim is:

1. The process of making magnesium sulfate which consists in mixing a finely pulverized dry material containing magnesium oxid with a hot aqueous solution of ferrous sulfate, in agitating this solution, whereby ferrous hydrate is precipitated and an aqueous solution of magnesium sulfate is obtained, and in separating the precipitate and solution.

2. The process of making magnesium sulfate which consists in mixing a hot aqueous solution of ferrous sulfate and dry finely divided double oxid of magnesium and calcium, in agitating the mixture, in separating the ferrous hydrate from the solution, and in removing the calcium sulfate from the solution by fractional crystallization.

3. The process of making magnesium sulfate which consists in mixing a hot aqueous solution of ferrous sulfate with finely pulverized double oxid of calcium and magnesium in quantity insufficient to completely neutralize the solution, and subsequently adding pulverized magnesium oxid in quantity sufficient to complete the neutralization of the solution, and in agitating the mixture.

4. The process of making magnesium sulfate which consists in mixing with a hot aqueous solution of ferrous sulfate, a finely pulverized double oxid of calcium and magnesium, the quantity of such oxid being less than necessary to neutralize the solution, and then adding enough pulverized magnesium oxid to completely neutralize the solution, in agitating the mixture, separating the precipitated ferrous hydrate by filtration, and finally in separating the calcium sulfate from the solution by fractional crystallization.

In testimony whereof, I hereunto affix my signature in the presence of two witnesses.

GRAHAM CLARKE.

Witnesses:
A. J. HUDSON,
L. I. PORTER.